United States Patent
Blagojevic

(10) Patent No.: US 11,643,218 B2
(45) Date of Patent: May 9, 2023

(54) AFT ENGINE MOUNT RING WITH SPIGOT

(71) Applicant: PRATT & WHITNEY CANADA CORP., Longueuil (CA)

(72) Inventor: Bosko Blagojevic, Etobicoke (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/395,049

(22) Filed: Aug. 5, 2021

(65) Prior Publication Data

US 2023/0044678 A1 Feb. 9, 2023

(51) Int. Cl.
*B64D 27/26* (2006.01)
*F02C 7/20* (2006.01)
*F02K 1/80* (2006.01)
*F01D 25/28* (2006.01)

(52) U.S. Cl.
CPC ........... *B64D 27/26* (2013.01); *F02C 7/20* (2013.01); *B64D 2027/262* (2013.01); *B64D 2027/264* (2013.01); *F01D 25/28* (2013.01); *F02K 1/80* (2013.01); *F05D 2220/323* (2013.01); *F05D 2240/90* (2013.01)

(58) Field of Classification Search
CPC .............. B64D 27/26; B64D 2027/262; B64D 2027/264; F02C 7/20; F01D 25/28; F02K 1/80; F05D 2220/323; F05D 2240/90
See application file for complete search history.

(56) References Cited

U.S. PATENT DOCUMENTS

| | | | |
|---|---|---|---|
| 2,722,801 A | 11/1955 | Lombard | |
| 5,642,615 A * | 7/1997 | Porte | B64D 27/18 244/54 |
| 6,843,449 B1 * | 1/2005 | Manteiga | B64D 27/26 244/54 |
| 8,894,034 B2 | 11/2014 | Rogero et al. | |
| 10,814,995 B2 | 10/2020 | West | |

(Continued)

FOREIGN PATENT DOCUMENTS

| | | |
|---|---|---|
| EP | 3299590 | 3/2018 |
| FR | 3097903 | 1/2021 |

OTHER PUBLICATIONS

European Search report dated Dec. 12, 2022 for corresponding application No. 22189124.5.

*Primary Examiner* — Gerald L Sung
*Assistant Examiner* — Rene D Ford
(74) *Attorney, Agent, or Firm* — Norton Rose Fulbright Canada LLP

(57) ABSTRACT

An assembly for mounting an aircraft engine to an aircraft includes an engine casing flange having a first annular wall extending radially to terminate at an annular rim. A second flange of an additional engine component mounted aft of the engine casing includes a second annular wall. An aft mount bracket has an annular body extending uninterrupted about the center axis and a spigot extending axially from the annular body, the spigot extending circumferentially about an entire circumference of the annular body. The aft mount bracket is axially disposed between the engine casing flange and the additional engine component, with corresponding holes in the first annular wall, second annular wall and aft mount bracket being circumferentially aligned, and the spigot radially abutting the annular rim of the engine casing flange.

17 Claims, 5 Drawing Sheets

(56) References Cited

U.S. PATENT DOCUMENTS

2013/0195605 A1* 8/2013 Robertson ............... F01D 11/18
  29/889.22
2013/0259664 A1* 10/2013 Denis .................... F01D 25/243
  228/160
2015/0075177 A1* 3/2015 Natal ..................... B64D 27/26
  60/797

* cited by examiner

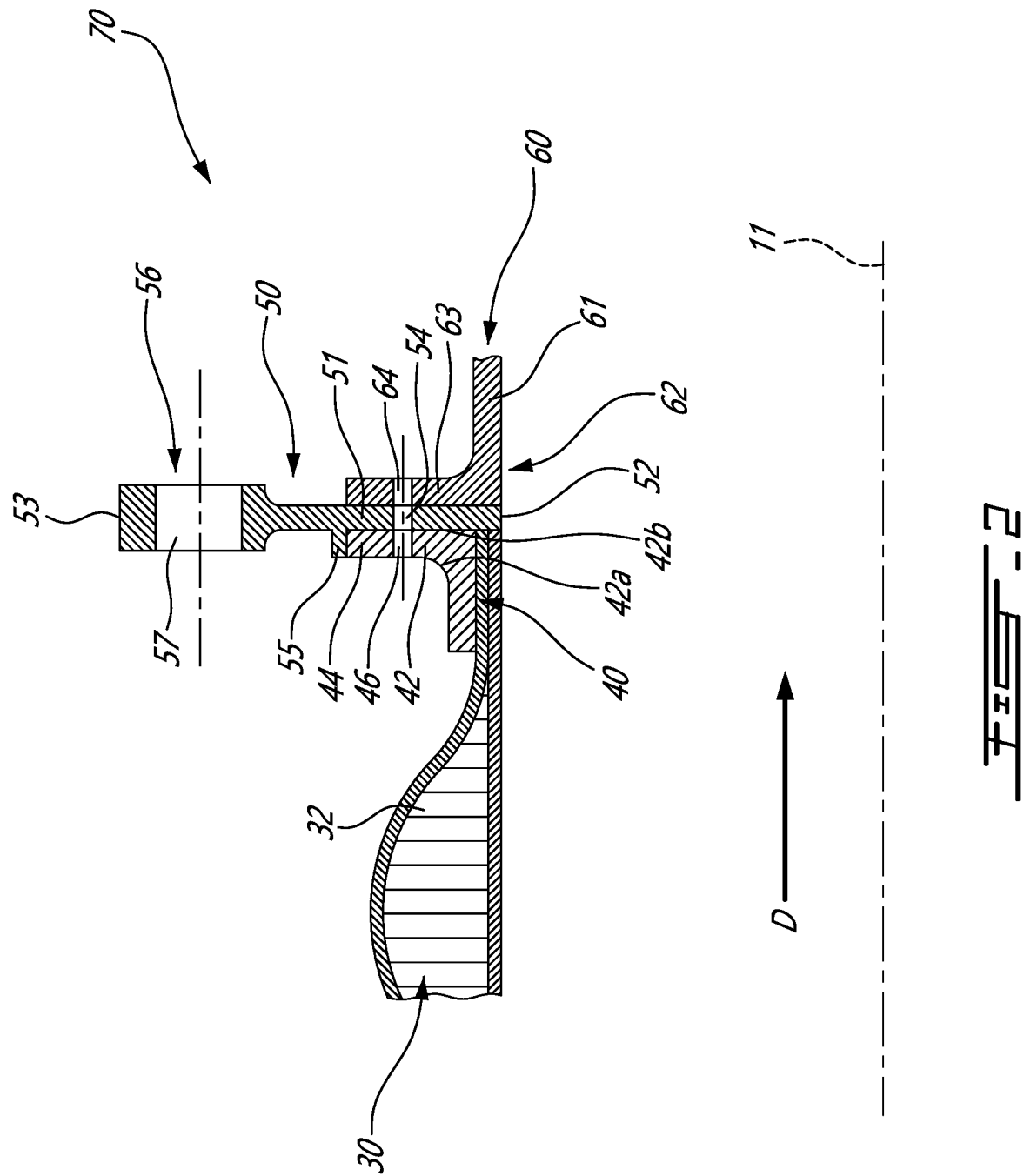

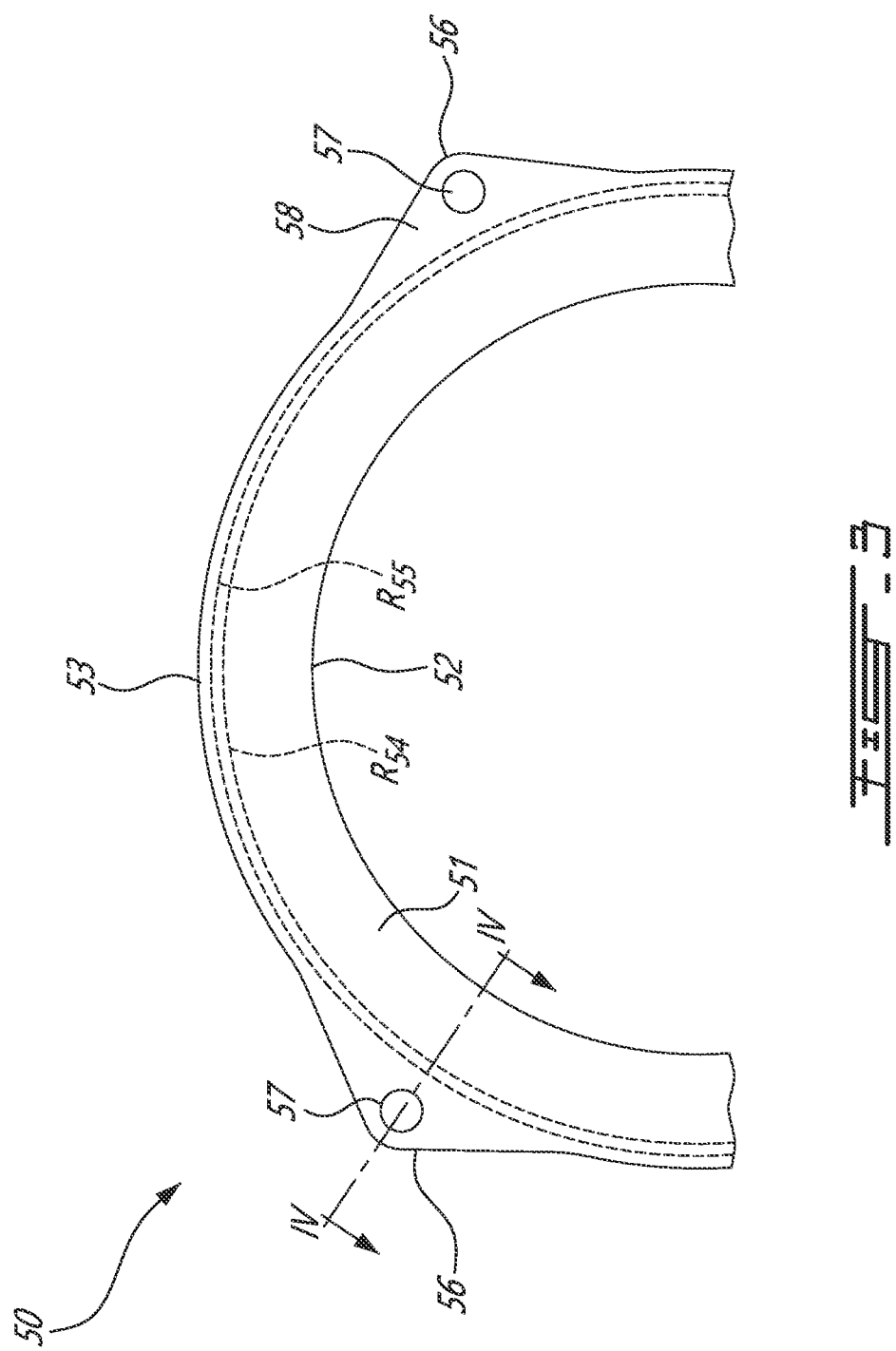

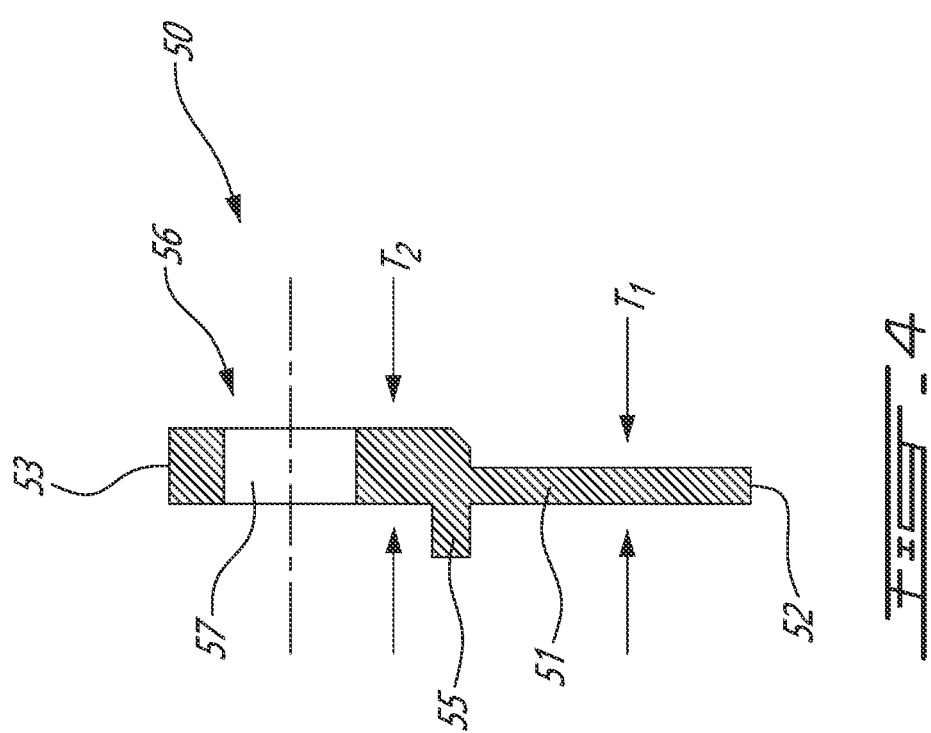

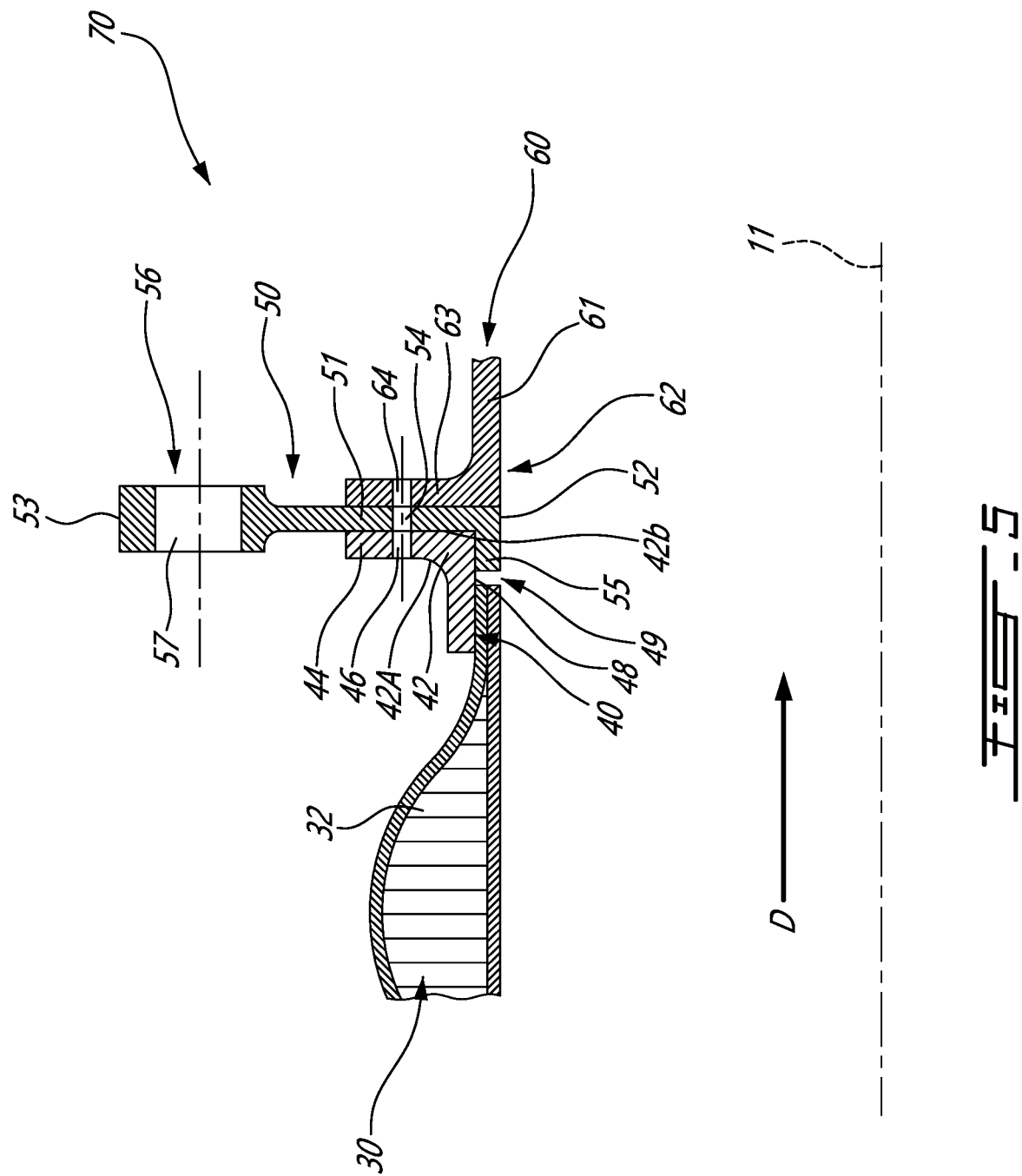

AFT ENGINE MOUNT RING WITH SPIGOT

TECHNICAL FIELD

The disclosure relates generally to aircraft engines, more particularly, to mounting assemblies for aircraft engines.

BACKGROUND

Aircraft engines may be mounted on an aircraft using different types of engine mounts. One common mounting configuration includes a forward mount and an aft mount, wherein the casing of the engine is mounted to the airframe of the aircraft at both the forward and aft mount locations. In certain engine mounting configurations, the rearward section of the outer bypass duct (OBPD) of a turbofan engine typically includes an aft flange, to which is fastened one or more aft engine mounting brackets that are used to fasten the engine to a complementary part of the airframe.

These aft engine mount brackets are required to meet fire standards, and are therefore often circumferentially, radially and/or axially larger than would be otherwise required from a structural/stress point of view in order to ensure fire safety standards are met. In addition, the fasteners used to mount discrete aft engine mounting brackets to the aft flange on the OBPD and to the airframe component (e.g., a thrust reverser (T/R) or exhaust duct) can become highly loaded, both radially and axially. In addition to high axial loads imposed on the bolts, they are also subject to shear, tension and/or bending loads which may be caused by other operational forces.

SUMMARY

In one aspect, there is provided an assembly for mounting an aircraft engine to an aircraft, comprising: an engine casing flange having a first annular wall extending circumferentially about a center axis and extending radially to terminate at an annular rim, a first set of holes in the first annular wall being circumferentially spaced apart and extending axially through the first annular wall; a second flange of an additional engine component mounted aft of the engine casing, the second flange having a body defined about the center axis with a second annular wall extending radially outwardly from the body, the second flange having a second set of holes circumferentially spaced apart and extending axially through the second annular wall; an aft mount bracket having an annular body extending uninterrupted about the center axis and a third set of holes circumferentially spaced apart and extending axially through the annular body, the aft mount bracket having a spigot extending axially from the annular body, the spigot extending circumferentially about an entire circumference of the annular body, the aft mount bracket further including one or more attachment points extending radially from a radially outer edge of the annular body, the one ore more attachment points having mounting holes adapted for mounting the aft mount bracket to the aircraft, wherein the aft mount bracket axially disposed between the engine casing flange and the additional engine component, with the first set of holes, the second set of holes and the third set of holes circumferentially aligned and the spigot radially abutting the annular rim of the engine casing flange; and fasteners received through the first set of holes, the second set of holes, and the third set of holes, the fasteners operable for axially retaining the engine casing flange, the additional engine component and the aft mount bracket ring.

The assembly as defined above may further include one or more of the following features, in whole or in part, and in any combination.

In certain embodiments, the aft mount bracket includes a first section having a first axial thickness and a second section comprising the attachment points having a second axial thickness greater than the first axial thickness.

In certain embodiments, the spigot is positioned radially outwardly from the third set of holes and the first section having the first axial thickness is positioned radially inwardly of the spigot.

In certain embodiments, a number and arrangement of the first set of holes in the first annular wall of the engine casing flange correspond to a number and arrangement of the third set of holes in the annular body of the aft mount bracket.

In certain embodiments, the additional engine component is a thrust reverser of the aircraft engine or an exhaust duct of the aircraft engine.

In certain embodiments, the attachment points include tapered edges joining the attachment points to the radially outer edge of the annular body.

In certain embodiments, the spigot is positioned radially outwardly from the third set of holes on the annular body of the aft mount bracket, the spigot radially abutting a radially outer rim of the engine casing flange.

In certain embodiments, the spigot is positioned at a radially inner edge of the annular body of the aft mount bracket, the spigot radially abutting a radially inner rim of the engine casing flange.

In another aspect, there is provided an aircraft engine, comprising: an engine casing with an aft flange on an outer bypass duct, the aft flange having a first annular wall extending circumferentially about a center axis and extending radially to terminate at an annular outer rim, a set of aft flange holes in the first annular wall being circumferentially spaced apart and extending axially through the first annular wall; and an aft mount bracket having an annular body extending uninterrupted about the center axis and a set of bracket holes circumferentially spaced apart and extending axially through the annular body, the aft mount bracket having a spigot extending axially from the annular body, the spigot extending circumferentially about an entire circumference of the annular body, the aft mount bracket further including one or more attachment points extending radially from a radially outer edge of the annular body, the one or more attachment points having mounting holes adapted for mounting the aft mount bracket to the aircraft, wherein the aft mount bracket is axially disposed adjacent the aft flange with the set of aft flange holes circumferentially aligned with the set of bracket holes and the spigot radially abutting the annular outer rim of the aft flange, the spigot being at least partially load bearing.

The aircraft engine as defined above may further include one or more of the following features, in whole or in part, and in any combination.

In certain embodiments, the aft mount bracket includes a first section having a first axial thickness and a second section comprising the attachment points having a second axial thickness greater than the first axial thickness.

In certain embodiments, the spigot is positioned radially outwardly from the set of bracket holes on the annular body and the first section having the first axial thickness is positioned radially inwardly of the spigot.

In certain embodiments, a number and arrangement of aft flange holes in the first annular wall of the aft flange on the outer bypass duct correspond to a number and arrangement of the set of bracket holes in the annular body of the aft mount bracket.

In certain embodiments, the aircraft engine includes an additional engine component having a body defined about the center axis with an annular flange disposed at an end thereof, the annular flange of the additional engine component having an annular wall extending radially outwardly from the body, the annular flange of the additional engine component having a set of additional holes circumferentially spaced apart and extending axially through the annular wall of the additional engine component, wherein the additional engine component is axially disposed against the aft mount bracket with the set of additional holes circumferentially aligned with the set of bracket holes and the set of aft flange holes.

In certain embodiments, the additional engine component is a thrust reverser of the aircraft engine or an exhaust duct of the aircraft engine.

In certain embodiments, the attachment points include tapered edges joining the attachment points to the radially outer edge of the annular body.

In certain embodiments, the spigot is positioned radially outwardly from the set of bracket holes on the annular body of the aft mount bracket, the spigot radially abutting a radially outer rim of the aft flange.

In certain embodiments, the spigot is positioned at a radially inner edge of the annular body of the aft mount bracket, the spigot radially abutting a radially inner rim of the aft flange.

There is further provided an aft mount bracket for mounting an engine casing to an aircraft, comprising: an annular body extending uninterrupted about a central axis, the annular body having a set of holes circumferentially spaced apart and extending axially through the annular body; an at least partially load bearing spigot extending axially from the annular body, the at least partially load bearing spigot extending circumferentially about an entire circumference of the annular body; and one or more attachment points extending radially from a radially outer edge of the annular body, the one or more attachment points having mounting holes adapted for mounting the aft mount bracket to the aircraft.

In certain embodiments, the aft mount bracket includes a first section having a first axial thickness and a second section comprising the attachment points having a second axial thickness greater than the first axial thickness.

In certain embodiments, the spigot is positioned radially outwardly from the set of holes or at a radially inner edge of the annular body.

BRIEF DESCRIPTION OF THE DRAWINGS

Reference is now made to the accompanying figures in which:

FIG. 2 is a partial cross sectional view of an engine mounting assembly for mounting the engine to an aircraft;

FIG. 3 is a partial rear view of an aft mount bracket of the engine mounting assembly of FIG. 2;

FIG. 4 is a cross sectional view of the aft mount bracket of the engine mounting assembly of FIG. 3, taken through line IV-IV in FIG. 3; and FIG. 5 is a partial cross sectional view of an engine mounting assembly for mounting the engine to an aircraft.

DETAILED DESCRIPTION

Figure 1:
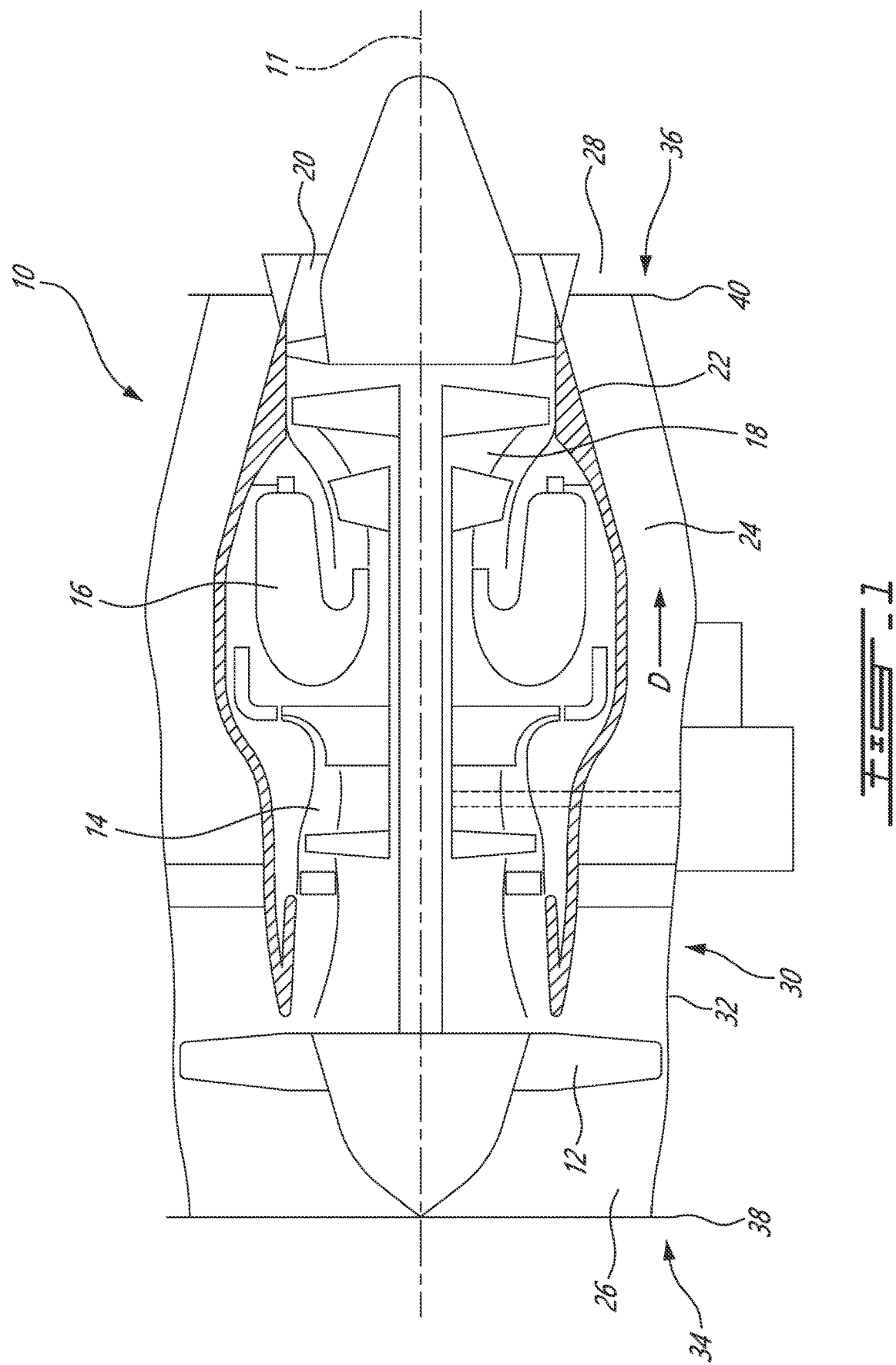
FIG. 1 is a schematic cross sectional view of an aircraft engine.

FIG. 1 illustrates an aircraft engine 10, which in this case is a gas turbine engine, of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases before they exist through an exhaust 20. The compressor section 14, combustor 16 and turbine section 18 are contained within an engine core 22, with the rotating components of the compressor section 14 and turbine section 18 rotatable about a central engine axis 11.

In the embodiment shown in FIG. 1, the engine 10 is a turbofan-type engine. An engine casing 30 surrounds the engine core 22, forming an outer bypass duct 24. The outer bypass duct 24 receives bypass air from the fan towards an inlet 26 of the engine and discharges the air at an outlet 28 where it mixes with the core gas flow exiting the exhaust 20. While FIG. 1 depicts a turbofan-type engine, the present disclosure is applicable to other types of aircraft engines as well.

The engine casing 30 may have an annular body 32 disposed about the central engine axis 11 and extending between a fore end 34 adjacent the inlet 26 and an aft end 36 adjacent the outlet 28. Irregular-shaped engine casing bodies 32, for instance to account for the shape of the engine core 22, may be contemplated as well. The engine casing 30 may include a fore flange 38 disposed about a circumference of the fore end 34 as well as an aft flange 40 disposed about a circumference of the aft end 36. The fore flange 38 and aft flange 40 may include holes or other attachment features to enable mounting hardware to fasten to the engine casing 30. The engine casing 30, and in turn the engine 10, may thus be secured to the airframe of an aircraft.

Referring to FIG. 2 in addition to FIG. 1, there is shown a mounting assembly 70 for an engine 10. In the shown case, the mounting assembly 70 is operable for attaching the engine casing 30 of engine 10 to the airframe of an aircraft. In the shown case, where the engine 10 is a turbofan engine and the engine casing 30 forms an outer bypass duct 24 around the engine core 22, the mounting assembly 70 includes a mount bracket 50 fastenable to an outer bypass duct (OBPD) aft flange 40 of the engine casing 30. Mount bracket 50 may be referred to as an aft mount bracket 50 in such cases where it is fastened to the aft end 36 of the engine casing 30. An additional component 60 may also be fastened to the flange 40 and aft mount bracket 50, for instance an exhaust manifold or a thrust reverser of the engine 10. In other cases, the mount bracket 50 may be operable to fasten to other flanges of components of the engine 10 to the airframe of the aircraft, for instance the fore flange 38 of the engine casing 30, a lifting bracket or an engine build-up (EBU) unit.

The aft flange 40 includes an annular wall 42 extending radially outwardly from the engine casing 30 towards a radially outer rim 44. In the shown case, the annular wall 42 has a constant thickness along its length towards the radially outer rim 44. A set of holes 46 are circumferentially spaced apart about the circumference of the annular wall 42 and extend through the annular wall 42 from a front side 42a of the annular wall 42 to a rear side 42b of the annular wall 42 relative to a direction D of the bypass air flowing through the outer bypass duct 24. The number and spacing of holes 46 may vary, for instance based on the engine type and its support requirements. In some embodiments, the aft flange 40 may be integral with the engine casing 30. In other cases, the aft flange 40 may be a separate component that is welded or otherwise attached to the aft end 36 of the engine casing 30.

In the shown case, the mount bracket 50 includes a fully annular body 51, and as such may be referred to as a mounting ring. By fully annular, it is understood that the annular body 51 extends circumferentially interruptedly about the center axis 11. As discussed above, mount bracket 50 may be referred to as an aft mount bracket 50 in the present disclosure when mounted to the aft flange 40 of the engine casing 30, but it other cases the mount bracket 50 may be mounted to other flanges within the engine 10. The annular body 51 extends between a radially inner edge 52 and a radially outer edge 53. The mount bracket 50 includes a set of holes 54 which are circumferentially spaced apart about the circumference of the annular body 51 and extend through the annular body 51. The number and spacing of the holes 54 may vary, and may coincide with the number and spacing of the holes 46 in the aft flange 40. In some cases, the mount bracket 50 may have a different bolt pattern for its holes 54 than the bolt pattern of the holes 46 in the flange 40, for instance to allow the mount bracket 50 to be used for other flanges without requiring modifications.

The mount bracket 50 further includes an at least partially load-reducing spigot 55 extending axially from the annular body 51 and disposed about the entire circumference of the annular body 51. The spigot 55 protrudes from the annular body 51, illustratively at a radial position between the radially inner edge 52 and the radially outer edge 53, although other locations may be contemplated as well. As will be discussed in further detail below, the spigot 55 is operable to abut against the radially outer rim 44 of the aft flange 40 upon assembly. In the shown case, the axial length of the spigot 55 is approximately equal to the thickness of the aft flange 40, although other axial lengths for the spigot 55 may be contemplated as well. The radial positioning of the spigot 55 along the annular body 51 may vary, for instance based on the height of the aft flange 40. Referring additionally to FIG. 3, which is an enhanced rear view of the mount bracket 50, the relative radial positions of the spigot 55 (denoted by radius $R_{55}$) and the holes 54 (denoted by radius $R_{54}$) are shown. In various cases, the radial distance between the spigot 55 and the holes 54 may vary, for instance depending on the geometry of the aft flange 40. For clarity, the holes 54 are omitted from FIG. 3.

The mount bracket 50 further includes one or more attachment points 56 positioned at various locations along the outer circumference of the radially outer edge 53 of the annular body 51. The attachment points 56, which may be referred to as local protrusions about the outer circumference of the annular body 51, may be machined to the radially outer edge 53 and include mounting holes 57 for mounting the mount bracket 50 to the airframe of the aircraft. Referring additionally to FIG. 3, in the shown case, the attachment points 56 include tapered edges 58 where the attachment points 56 meet the radially outer edge 53 of the annular body 51, for instance to improve load distribution. The number and positioning of the attachment points 56 may vary, for instance based on the weight of the engine 10 being attached to the airframe and/or the bolt pattern at the airframe. While FIG. 3 shows two attachments points 56, it is understood that FIG. 3 only depicts a portion of a mount bracket 50, and that various numbers of attachment points 56 may be contemplated. In various embodiments, attachment points 56 may be regularly or irregularly positioned about the outer circumference of the annular body 51.

As discussed above, the additional component 60 may be one of an exhaust manifold or a thrust reverser for the engine 10 that are fastened to the aft end 36 of the engine casing 30. Other additional components 60 may be contemplated as well. In other cases, the mount bracket 50 may be fastened to the aft flange 40 (or another flange within the engine 10) with no additional component 60 being concurrently attached. In the shown case, the additional component 60 includes an annular body 61, a flange 62 having an annular wall 63 extending radially outwardly from the annular body 61, and holes 64 circumferentially spaced apart about the circumference of the annular wall 63 and extending through the annular wall 63. The number and spacing of the holes 64 may vary, and may generally correspond to the number and spacing of holes 46 and 64 in the aft flange 40 and mount bracket 50, respectively.

As shown in FIG. 2, in an exemplary assembly procedure, the mount bracket 50 is placed axially between aft end 36 of the engine casing 30 and the additional component 60, with the annular body 51 abutting annular wall 42 of the aft flange 40 and the annular wall 63 of the additional component 60. The mount bracket 50 is oriented so that the annular body 51 abuts the rear side 42b of the annular wall 42, with the spigot 55 oriented in an axially rearward direction and radially abutting the radially outer rim 44 of the annular wall 42 in a spigot fit arrangement. The various components may then be rotated relative to each other so that the holes 46, 54 and 64 are aligned and the attachment points 56 are positioned in suitable locations relative to the airframe of the aircraft for secure attachment. Threaded fasteners, for example bolts (not shown), are passed through the holes 46, 54 and 64 for secure attachment of the mount bracket 50 to the engine casing 30 and the additional component 60, with the spigot bearing at least some of the load imparted by the fasteners. Other assembly steps and configurations may be contemplated as well. For instance, in another embodiment that does not include the additional component 60, the mount bracket 50 may be positioned so that the annular body 51 abuts the front side 42a of the annular wall 42 with the spigot 55 extending in an axially rearward direction as it radially abuts the radially outer rim 44. Other arrangements may be contemplated as well.

Referring additionally to FIG. 4, in some embodiments the axial thickness of the annular body 51 may vary between the radially inner edge 52 and the radially outer edge 53. In the shown case, the annular body 51 has first section with a first thickness T1 and a second section with a second thickness T2 at its radially outer edges 53 at the circumferential locations of the attachment points 56, the second thickness T2 being greater than the first thickness T1. As shown in FIG. 4, the second section having the thickness T2 may commence radially outwardly of the spigot and extend to the radially outer edge 53 of each attachment point 56, and include the tapered edges 58. In such cases, the entire portion of the annular body 51 positioned radially inwardly of the spigot 55 would have thickness T1. In other cases, the first section of the annular body 51 having thickness T1 may partially extend radially outwardly of the spigot 55. The greater thickness at the attachment points 56 may allow the attachment points 56 to withstand the loads imparted by their attachment to the airframe of the aircraft. In addition, various types of bearings may be passed through the mounting holes 57 to attach the attachment points 56 to the airframe, and thus the greater thickness at the attachment points 56 may accommodate the width of said bearings. The remainder of the annular body 51 may be of lesser first thickness T1 as the loads imparted by the aft flange 40, additional component 60 and attachment points 56 are distributed about the entire circumference of the annular body 51. In addition, the spigot 55 may be least partially load bearing, lightening the load requiring the annular body 51 to bear.

Referring to FIG. 5, there is shown another embodiment of a mounting assembly 70 for an engine 10, with like reference numerals used hereinafter to identify like components. In the depicted embodiment, the mounting assembly 70 is operable for attaching the engine casing 30 of engine 10 to the airframe of an aircraft, and includes a mount bracket 50 fastenable to an outer bypass duct (OBPD) aft flange 40 of the engine casing 30. In the depicted embodiment, the spigot 55 protrudes axially from the annular body 51 at the radially inner edge 52 of the annular body 51. In addition, the spigot 55 is operable to radially abut a radially inner rim 48 of the annular wall 42 of the aft flange 40. Illustratively, the aft flange 40 includes an indentation 49 at the radially inner rim 48 to accommodate the spigot 55. In some cases, for instance where the aft flange 40 is a separate component from the engine casing 30, the aft flange 40 may be positioned to overhang from the aft end 36 of the engine casing 30 to form the indentation 49. In other cases, for instance where the aft flange 40 is integrated with the engine casing 30, the indentation 49 may be formed as a cutout in the aft end 36 of the engine casing 30.

In various cases, by providing a single mount bracket 50 with a annular body 51, in lieu of multiple discrete aft engine mounting brackets that are typically used, the load may be able to be better circumferentially distributed (and thus optimized), thereby reducing stress concentrations in comparison with said typically-used multiple aft engine mounting brackets. In addition, the integrated spigot 55 may relieve the fasteners passing through the holes 54 of shear loads induced by the mount bracket 50. In other words, at least some of the radial shear loads to which the fasteners would be otherwise exposed may be taken by the spigot 55 and/or the mount bracket 50 itself. Thus, it may be possible to use fewer and/or smaller fasteners due to the reduce loads they are required to sustain.

In various cases, the mount bracket 50 may be made from a fire-resistant material (e.g., steel). As such, the herein described mount bracket may improve fire resistance by assuring circumferential integrity of composite or aluminum engine casings 30 at the aft mount plane, in case of fire.

In various cases, by providing an aft mount bracket 50 with a annular body 51, the attachment points 56 may be positioned at any point about the outer circumference of the annular body 51 based on the mounting requirements with the airframe of the aircraft, regardless of the bolt pattern of the holes 46 in the aft flange 40.

In some cases, the annular body 51 may not include a spigot 55. For instance, based on the size and weight of the engine casing 30, the annular body 51 may be capable of distributing the loads from the fasteners so that the at least partial load bearing provided by the spigot 55 is not required. In addition, in such cases the attachment points 56 may be positioned independently of the bolt pattern of the holes 4 in the aft flange 40. In other cases, for instance as shown in FIGS. 2-4, the engine casing 30 may be sized such that the at least partial load bearing provided by the spigot 55 is required.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An assembly for mounting an aircraft engine to an aircraft, comprising:
   an engine casing flange having a first annular wall extending circumferentially about a center axis and extending radially to terminate at an annular rim, a first set of holes in the first annular wall being circumferentially spaced apart and extending axially through the first annular wall;
   a second flange of an additional engine component mounted aft of the engine casing, the second flange having a body defined about the center axis with a second annular wall extending radially outwardly from the body, the second flange having a second set of holes circumferentially spaced apart and extending axially through the second annular wall;
   an aft mount bracket having an annular body extending uninterrupted about the center axis and a third set of holes circumferentially spaced apart and extending axially through the annular body, the aft mount bracket having a spigot extending axially from the annular body, the spigot extending circumferentially about an entire circumference of the annular body, the aft mount bracket further including one or more attachment points extending radially from a radially outer edge of the annular body, the one ore more attachment points having mounting holes adapted for mounting the aft mount bracket to the aircraft, wherein the aft mount bracket is axially disposed between the engine casing flange and the additional engine component, with the first set of holes, the second set of holes and the third set of holes circumferentially aligned and the spigot radially abutting the annular rim of the engine casing flange; and
   fasteners received through the first set of holes, the second set of holes, and the third set of holes, the fasteners operable for axially retaining the engine casing flange, the additional engine component and the aft mount bracket.

2. The assembly as defined in claim 1, wherein the aft mount bracket includes a first section having a first axial thickness and a second section comprising the attachment points having a second axial thickness greater than the first axial thickness.

3. The assembly as defined in claim 2, wherein the spigot is positioned radially outwardly from the third set of holes and the first section having the first axial thickness is positioned radially inwardly of the spigot.

4. The assembly as defined in claim 1, wherein a number and arrangement of the first set of holes in the first annular wall of the engine casing flange correspond to a number and arrangement of the third set of holes in the annular body of the aft mount bracket.

5. The assembly as defined in claim 1, wherein the additional engine component is a thrust reverser of the aircraft engine or an exhaust duct of the aircraft engine.

6. The assembly as defined in claim 1, wherein the attachment points include tapered edges joining the attachment points to the radially outer edge of the annular body.

7. The assembly as defined in claim 1, wherein the spigot is positioned radially outwardly from the third set of holes on the annular body of the aft mount bracket, the spigot radially abutting a radially outer rim of the engine casing flange.

8. The assembly as defined in claim 1, wherein the spigot is positioned at a radially inner edge of the annular body of the aft mount bracket, the spigot radially abutting a radially inner rim of the engine casing flange.

9. An aircraft engine, comprising:
an engine casing with an aft flange on an outer bypass duct, the aft flange having a first annular wall extending circumferentially about a center axis and extending radially to terminate at an annular outer rim, a set of aft flange holes in the first annular wall being circumferentially spaced apart and extending axially through the first annular wall; and
an aft mount bracket having an annular body extending uninterrupted about the center axis and a set of bracket holes circumferentially spaced apart and extending axially through the annular body, the aft mount bracket having a spigot extending axially from the annular body, the spigot extending circumferentially about an entire circumference of the annular body, the aft mount bracket further including one or more attachment points extending radially from a radially outer edge of the annular body, the one or more attachment points having mounting holes adapted for mounting the aft mount bracket to the aircraft, wherein the aft mount bracket is axially disposed adjacent the aft flange with the set of aft flange holes circumferentially aligned with the set of bracket holes and the spigot radially abutting the annular outer rim of the aft flange, the spigot being at least partially load bearing.

10. The aircraft engine as defined in claim 9, wherein the aft mount bracket includes a first section having a first axial thickness and a second section comprising the attachment points having a second axial thickness greater than the first axial thickness.

11. The aircraft engine as defined in claim 10, wherein the spigot is positioned radially outwardly from the set of bracket holes on the annular body and the first section having the first axial thickness is positioned radially inwardly of the spigot.

12. The aircraft engine as defined in claim 9, wherein a number and arrangement of aft flange holes in the first annular wall of the aft flange on the outer bypass duct correspond to a number and arrangement of the set of bracket holes in the annular body of the aft mount bracket.

13. The aircraft engine as defined in claim 9, further comprising an additional engine component having a body defined about the center axis with an annular flange disposed at an end thereof, the annular flange of the additional engine component having an annular wall extending radially outwardly from the body, the annular flange of the additional engine component having a set of additional holes circumferentially spaced apart and extending axially through the annular wall of the additional engine component, wherein the additional engine component is axially disposed against the aft mount bracket with the set of additional holes circumferentially aligned with the set of bracket holes and the set of aft flange holes.

14. The aircraft engine as defined in claim 13, wherein the additional engine component is a thrust reverser of the aircraft engine or an exhaust duct of the aircraft engine.

15. The aircraft engine as defined in claim 9, wherein the attachment points include tapered edges joining the attachment points to the radially outer edge of the annular body.

16. The aircraft engine as defined in claim 9, wherein the spigot is positioned radially outwardly from the set of bracket holes on the annular body of the aft mount bracket, the spigot radially abutting a radially outer rim of the aft flange.

17. The aircraft engine as defined in claim 9, wherein the spigot is positioned at a radially inner edge of the annular body of the aft mount bracket, the spigot radially abutting a radially inner rim of the aft flange.

* * * * *